April 27, 1954  C. R. McFALL  2,676,627
VENEER SLICER
Filed Oct. 18, 1948  11 Sheets-Sheet 1

INVENTOR.
Charles Ralph McFall
BY
Stevens, Davis, Miller & Mosher
ATTORNEYS

April 27, 1954

C. R. McFALL 2,676,627

VENEER SLICER

Filed Oct. 18, 1948

INVENTOR.
Charles Ralph McFall
BY
Stevens, Davis, Miller and Mosher
ATTORNEYS

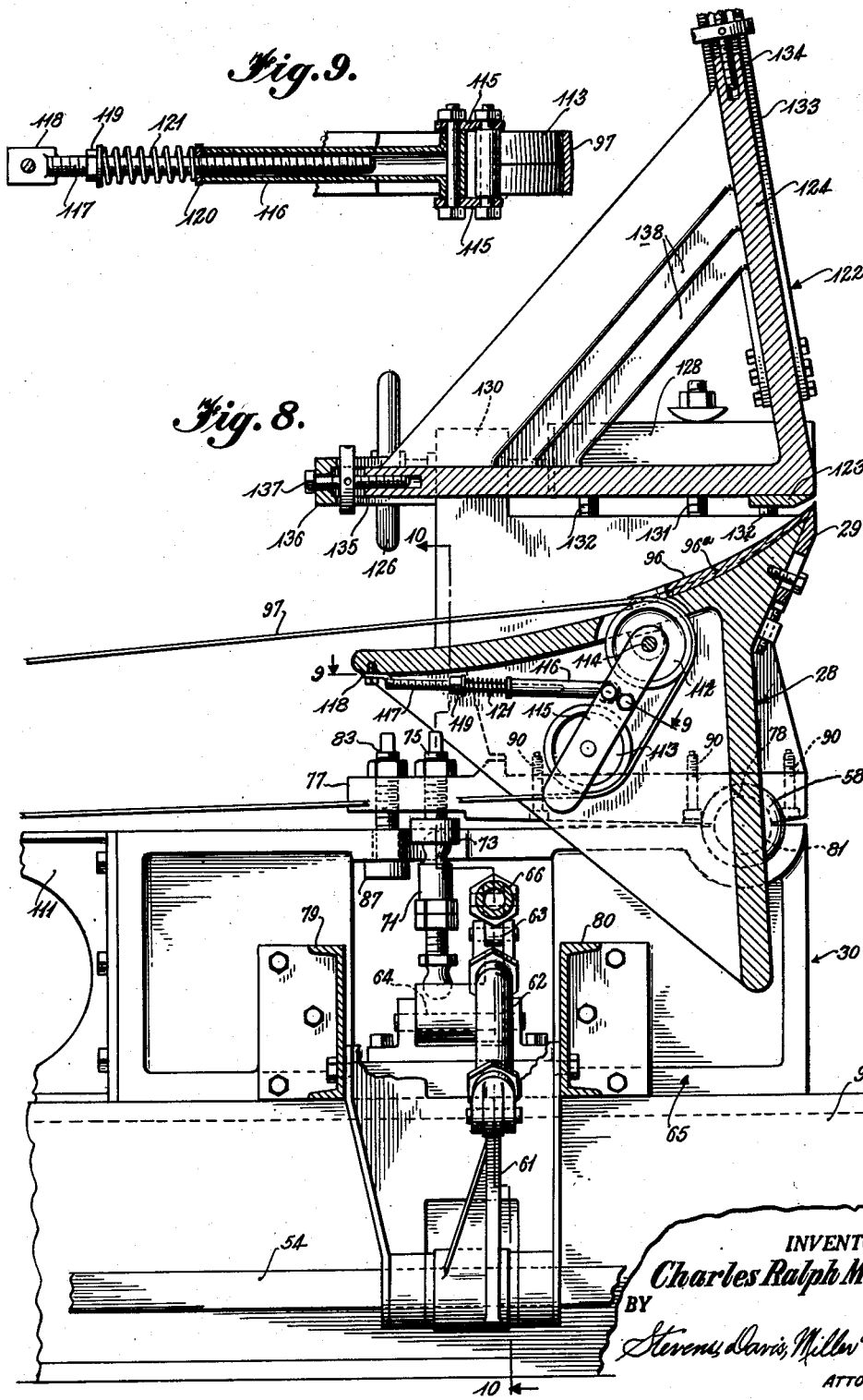

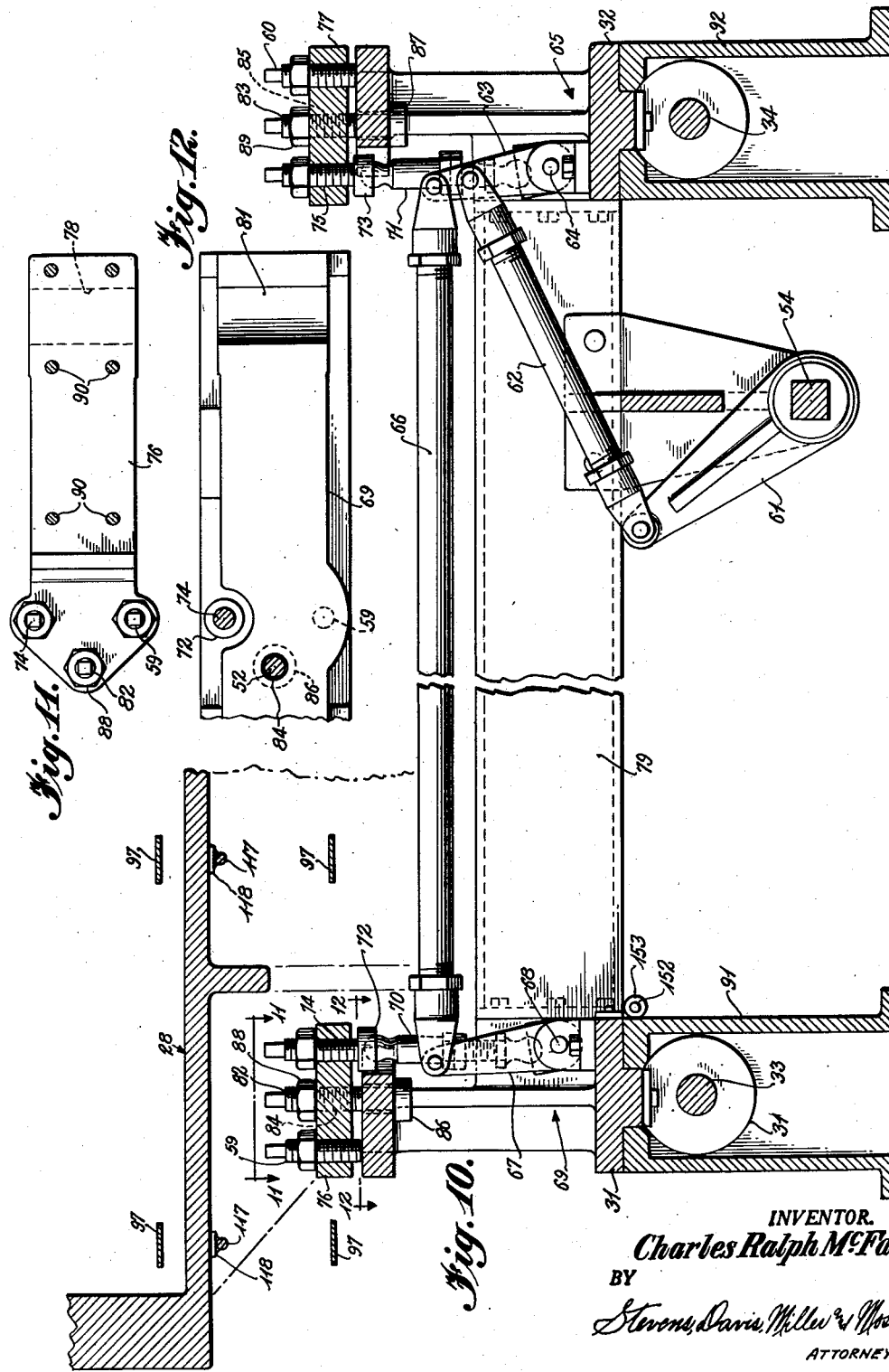

April 27, 1954     C. R. McFALL     2,676,627
VENEER SLICER
Filed Oct. 18, 1948     11 Sheets-Sheet 9
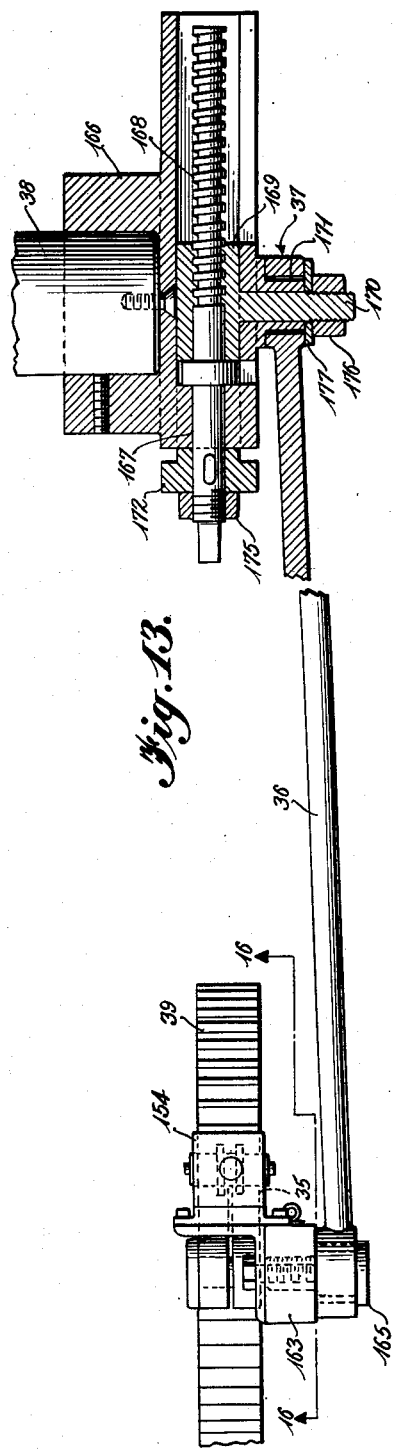
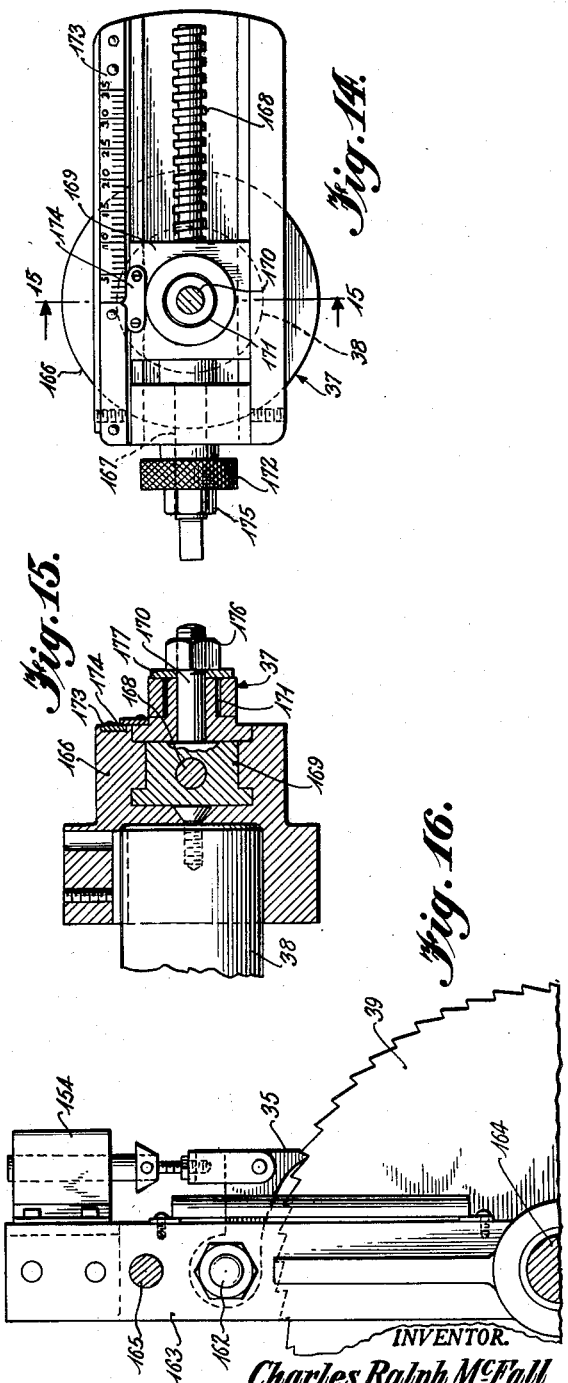
INVENTOR.
Charles Ralph McFall
BY
Stevens, Davis, Miller & Mosher
ATTORNEYS

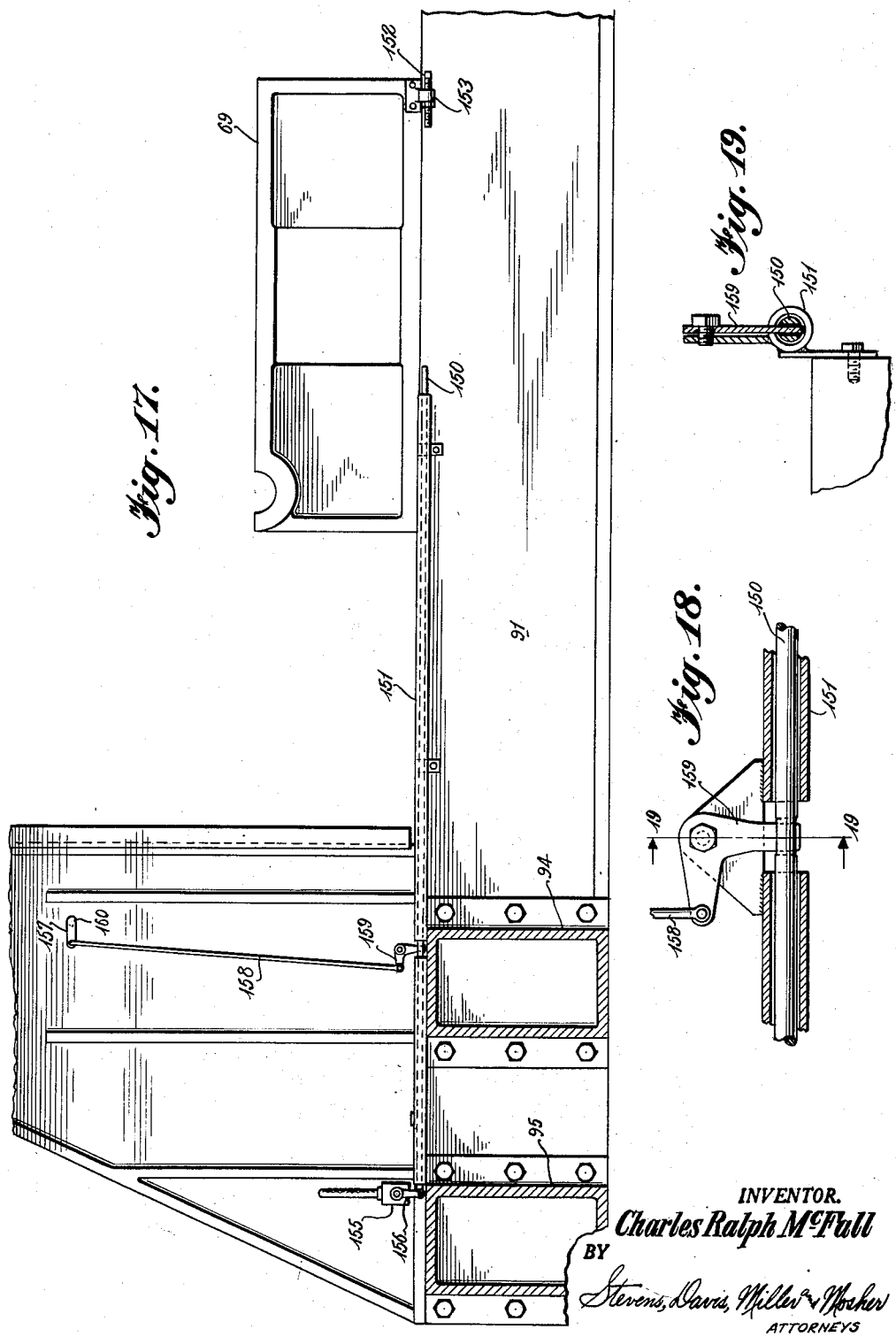

April 27, 1954  C. R. McFALL  2,676,627
VENEER SLICER

Filed Oct. 18, 1948  11 Sheets-Sheet 11

INVENTOR.
Charles Ralph McFall
BY
Stevens, Davis, Miller & Mosher
ATTORNEYS

Patented Apr. 27, 1954

2,676,627

UNITED STATES PATENT OFFICE 2,676,627

VENEER SLICER

Charles Ralph McFall, Johnson City, Tenn., assignor to Johnson City Foundry & Machine Works, Inc., Johnson City, Tenn., a corporation of Tennessee Application October 18, 1948, Serial No. 55,183

8 Claims. (Cl. 144—178)

This invention relates to veneer slicers of the reciprocating flitch type such as are utilized in the production of high quality furniture veneers, paneling and the like.

While veneer slicers of the reciprocating flitch type have been known for many years and have achieved a considerable measure of success, there were heretofore many features of their structure and operation which gave rise to problems of a serious nature.

Basically the user of a veneer cutting machine is concerned with the quality of the work done, the speed with which it may be accomplished and the protection of the operators against injury and the equipment against damage. However, despite the generally high quality of the output of the reciprocating flitch type veneer slicer, there are several inherent features of this type of machine slicer which mitigate against the maintenance of high standards in all of the foregoing categories. One of these is the tremendous mass of the flitch table and flitch and the counterweights therefor which have such a large operating inertia that quick stoppage of the flitch has been heretofore difficult of achievement with the result that cutting knives have been damaged by engagement with foreign obstructions embedded in the flitch and occasionally operators have been injured because of the difficulty encountered in stopping the flitch table quickly enough to permit the operator to reassume a safe position before being injured by some moving part of the machine.

Another problem which has been present for many years is that of stopping the advance of the knife when the flitch has become exhausted or when, for any reason, it is desired to stop the cutting operation.

Aside from the problems incident to preventing damage to the flitch and machine, there is also the problem of removing the slices from the vicinity of the knife in such a way as to avoid stains, splitting and injury to the operator. Heretofore this has been done manually and was an exacting and somewhat dangerous operation.

In summary, therefore, it can be seen that the veneer slicers of the prior art, while capable of producing good quality results, required the constant attendance of an alert and skilled operator.

It is an object of this invention to overcome the foregoing disadvantages of the reciprocating flitch type veneer slicer and to provide a slicer of that type which is characterized by safe, high speed operation and the production of top quality slices suitable for use in manufacturing furniture and the like.

More specifically it is an object of this invention to provide for arresting the advance of the knife automatically at any predetermined position whereby to cause the cessation of the slicing operation at any desired stage in the consumption of the flitch.

It is also contemplated according to the present invention that the slices cut from the flitch be delivered automatically at a constant rate and free of stain or of stresses capable of producing splitting to a safe position beyond the moving parts of the machine despite variations in the thickness of the slices cut or in the number of slices cut per unit time.

A still further object of this invention is to provide a brake which may be instantly set to stop the motion of the flitch table should a blade-damaging object be encountered in the flitch.

Other objects and advantages of this invention will be apparent upon consideration of the following detailed description of an embodiment thereof in conjunction with the annexed drawings wherein:

Figure 8 is a view in vertical section taken on the line 8—8 of Figure 6;

Figure 9 is a detailed view of a portion of the belt supporting mechanism illustrated in Figure 8;

Figure 10 is a view in vertical section taken on line 10—10 of Figure 8;

Figure 11 is a plan view taken from the plane of the line 11—11 of Figure 10;

Figure 12 is a horizontal sectional view taken on the line 12—12 of Figure 10;

Figure 13 is a view partially in plan and partially in horizontal section of the mechanism for controlling the advance of the knife to the flitch;

Figure 14 is a view in side elevation of the portion of the mechanism of Figure 13 that controls the rate of advance of the knife toward the flitch;

Figure 15 is a view in vertical section taken on the line 15—15 of Figure 14;

Figure 16 is a fragmentary view in elevation of the driving mechanism for advancing the knife and of the apparatus for disengaging said mechanism;

Figure 17 is a view in elevation of the apparatus for energizing the disengaging apparatus of Figure 16;

Figure 18 is a detailed view of a connecting part of the apparatus of Figure 17;

Figure 19 is a view in section taken on the line 19—19 of Figure 18; and

Figure 1:
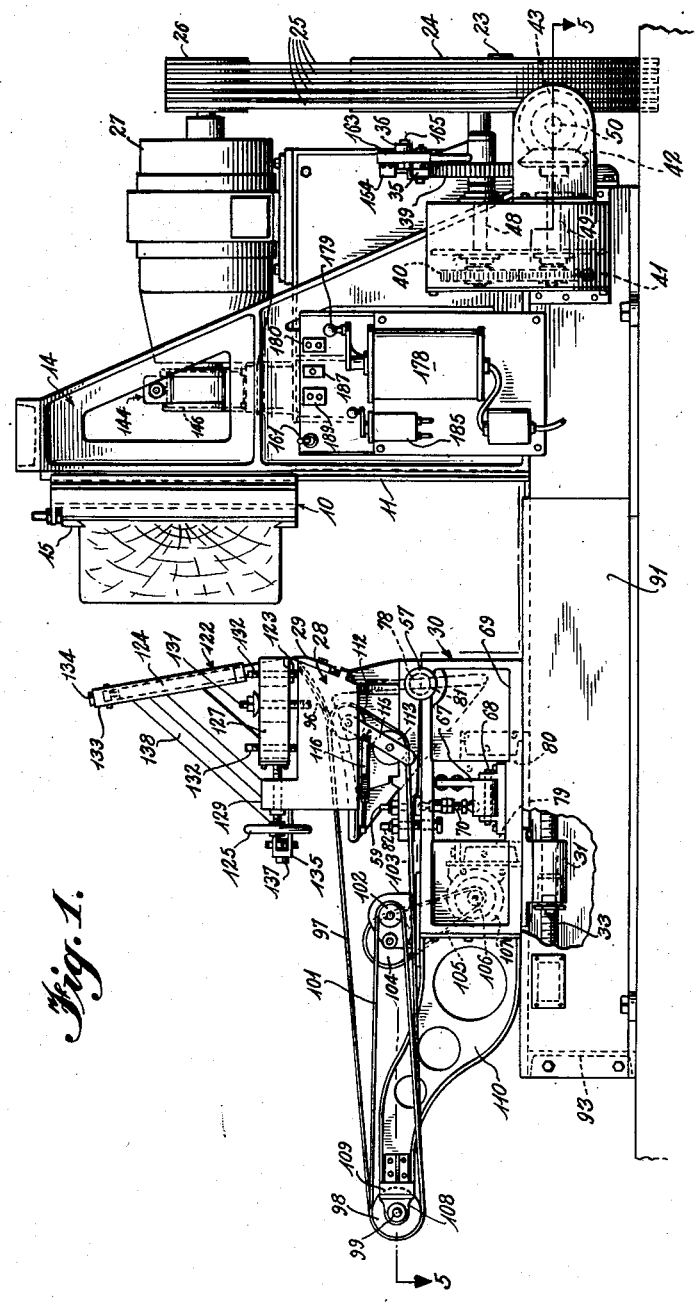
Figure 1 is a view in side elevation of a veneer slicer constructed in accordance with the principles of the present invention.

Before a specific description of the various components of the present machine is undertaken, a a general description of its component sub-assemblies will be undertaken. These in their interrelation can best be understood in conjunction with Figures 1, 2, 3 and 4 of the drawings.

In these figures the numeral 10 represents a flitch table mounted for reciprocation on three guide rails 11, 12 and 13 supported from a frame 14. The flitch table 10 is provided with a plurality of adjustable dogs 15 for holding the flitch from which veneer sheets are to be cut. The flitch table 10 is reciprocated by pitmans 16 and 17 that are pivotally connected at 18 and 19 respectively to the upper edge of the table and which at their opposite ends are pivotally connected to gears 20 and 21 respectively. The gears 20 and 21 mesh with a pinion 22 which is fast to a shaft 23 having keyed thereto a multiple V-groove pulley 24 which is connected by multiple V-belts 25 to a driving sheave 26 which is fast to the driving shaft of a main electric motor 27.

Figure 5:
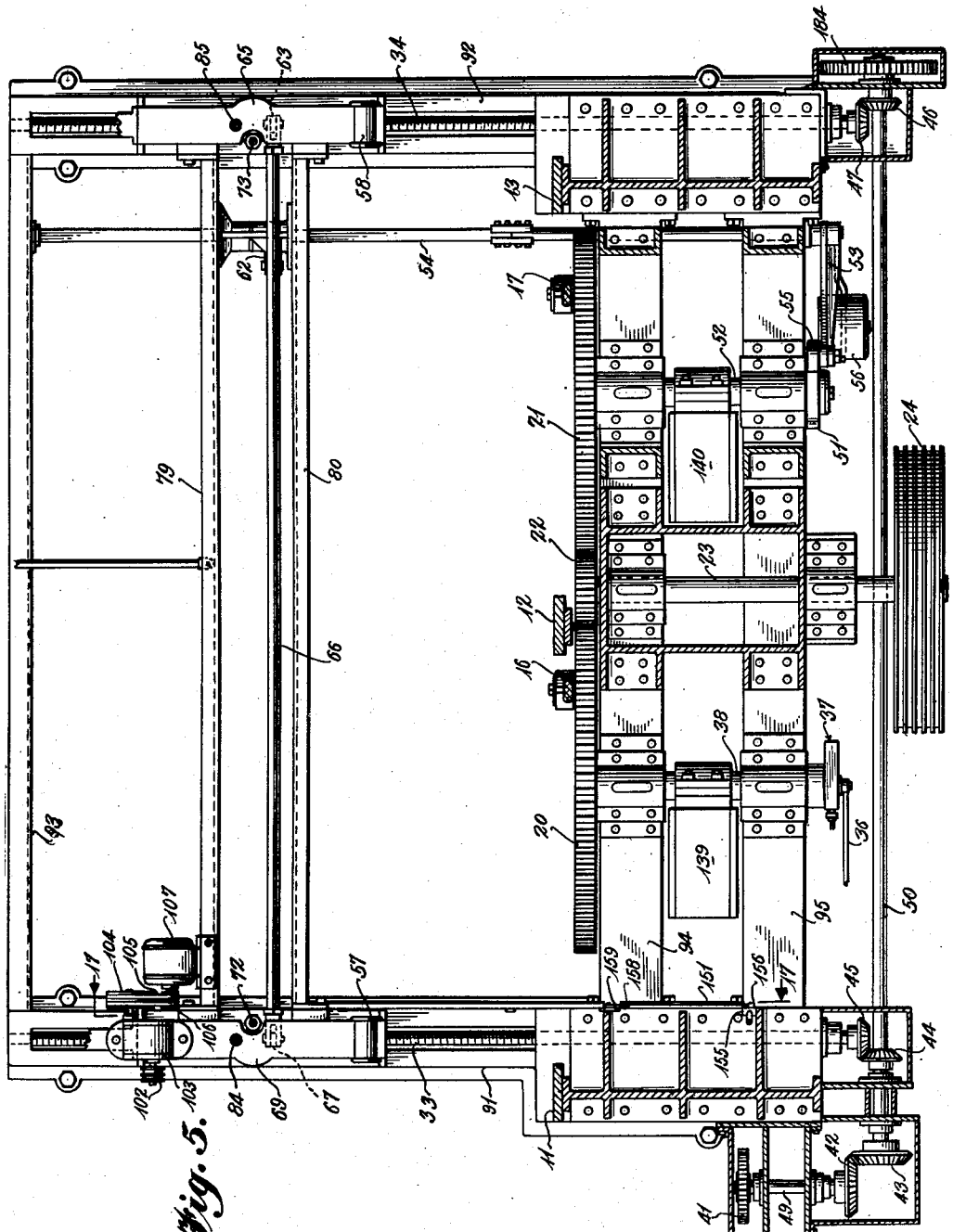
Figure 5 is a view in section taken on the line 5—5 of Figure 1.

As the motor 27 causes the flitch to reciprocate through the instrumentalities described above, a knife bar assembly 28 carrying a knife 29 is advanced in periodic increments toward the path of the flitch and into cutting relation therewith. This is accomplished by mounting the knife bar assembly 28 on a table 30 which is provided with internally threaded lugs 31 and 32 which coact with threaded rods 33 and 34 respectively (see Figure 5). The threaded rods 33 and 34 are driven from a ratchet and pawl assembly, the pawl 35 of which is connected by a link 36 to an adjustable crank 37 mounted on the shaft 38 to which the gear 20 is also attached. As the ratchet wheel 39, of the ratchet and pawl assembly, is rotated by action of its pawl 35, this movement is imparted to the threaded rods 33 and 34 through a gear train including pinions 40 and 41 and bevel gears 42, 43, 44, 45, 46 and 47. The pinion 40 is fixed to a shaft 48 to which the ratchet wheel 39 is also attached. The pinion 41 and the bevel gear 42 are keyed to a common shaft 49 while the bevel gears 43, 44 and 46 are keyed to a common shaft 50 extending at right angles to the shaft 49 and across the back of the machine. The bevel gear 44 meshes directly with the bevel gear 45 which is keyed to the threaded rod 33 and the bevel gear 46 meshes with bevel gear 47 which is keyed to the threaded shaft 34.

Since the frequency of the angular displacement of the threaded shafts 33 and 34 per revolution of the gear 20 is controlled by crank 37, it is apparent that the table 30 will advance toward the flitch one unit per revolution of the gear 20 and hence one unit per cycle of movement of the flitch. The magnitude of the movement is dependent upon the length of the arm of the crank 37 and the phase relationship is determined by the relative angular positions of the connection of the pitman 16 to the gear 20 and the crank. The latter are arranged so as to cause the stepwise advancement of the knife table 30 toward the flitch table 10 during the upstroke of the latter.

Since the advancement of the knife against the flitch during the upstroke of the latter might cause damage to the flitch surface from which the slice is taken, provision is made to retract the knife bar assembly 28 and the knife 29 to a small degree relative to the table 30 during the upstroke of the flitch.

The power for this movement is derived from the motor 27 and is taken off by a cam 51 mounted on a shaft 52 to which the gear 21 is also fixed. A bell crank 53 is attached to a rock shaft 54 which extends under the knife table 30 and one arm of the bell crank 53 is provided with a cam follower 55 while the other arm thereof is provided with a counterweight 56 for the purpose of holding the follower 55 against the cam 51.

It can now be seen that for a little more than 90° of each revolution of shaft 52, that shaft 54 will be held in one position while for another 90° movement of shaft 52, shaft 54 will be held in another position the intermediate portions of the angular displacement being employed in effecting the change from one position to the other. The cam 51 is so located on the shaft 52 that one position of the rock shaft 54 is assumed during the upstroke of the flitch table 10 and the other is assumed during the cutting stroke thereof, the changes from one position to the other occurring during the change in direction of the flitch table. This timing is developed so that rock shaft 54 can cause the rocking movement of the knife bar assembly 28 relative to the table 30 so as to keep the blade 29 from scoring the flitch during the concurrent advancement of the knife bar assembly and upstroke of the flitch.

Figure 6:
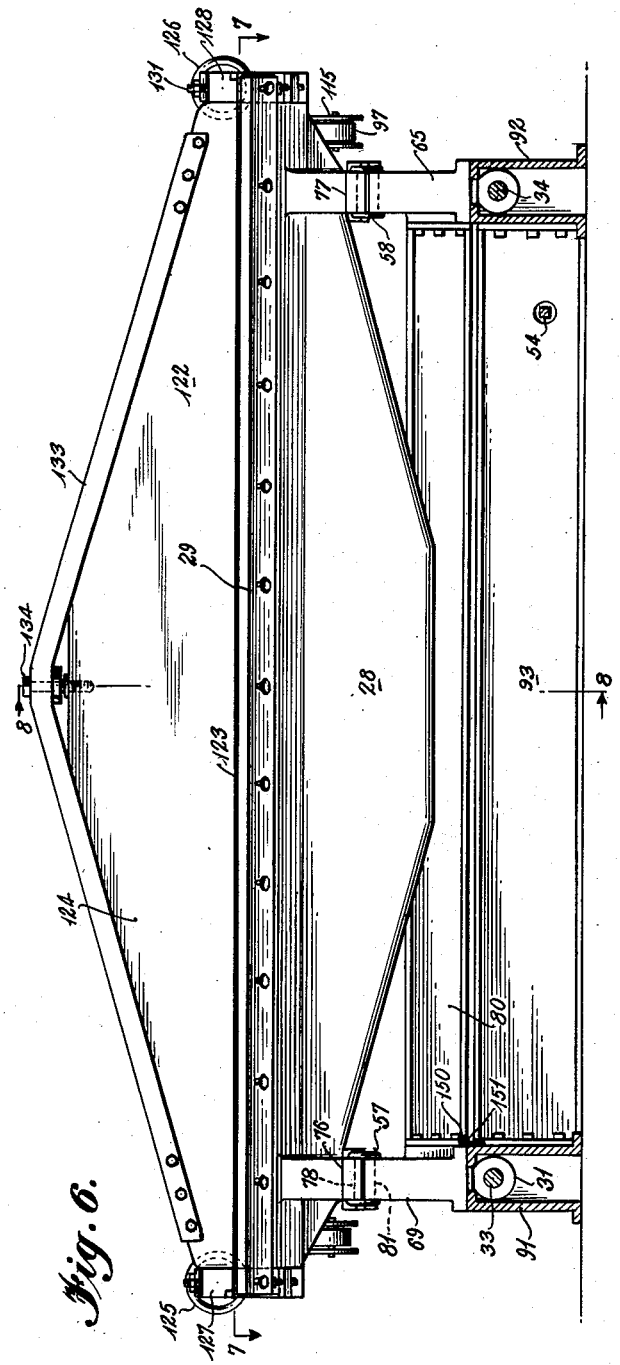
Figure 6 is a view predominantly in elevation looking at the face of the knife and the assembly associated therewith.

Upon reference to Figure 6 it will be noted that the knife bar assembly 28 is mounted for rocking movement on the table 30 by stub shafts or stub journals 57 and 58 arranged at opposite sides of the table 30 and the knife bar assembly 28. The axis of the journals 57 and 58 is so located relative to the center of gravity of the knife bar assembly 28 that the assembly 28 tends normally to move in a counterclockwise direction from the Figure 1 position. This movement is arrested, however, by two adjustable set screws 59 and 60, see Figure 10.

Movement in a clockwise direction, as viewed in Figure 1, is accomplished by the rock shaft 54 which is square in cross section for part of its length to accommodate an arm 61 connected by a pitman 62 to an arm 63 pivoted on a stub shaft 64 mounted in a sub-frame 65 of the main table 30. The arm 63 is connected by a pitman 66 with another arm 67 located on the opposite side of the machine and pivotally mounted on a stub shaft 68 located in a sub-frame 69 of the main table 30.

Each of the arms 63 and 67 includes at its base near the axis of pivot a groove constituting a ball socket, see Figure 10. The ball socket of the arm 67 receives a ball constituting the end of a link 70 and the ball socket of the arm 63 receives a ball constituting the end of a link 71. The links 70 and 71 are composed of complementarily threaded mutually telescoping elements and are individually adjustable as to length. At their ends remote from the connections to links 67 and 63 respectively they are received in sockets 72 and 73 respectively.

The sockets 72 and 73 respectively are mounted on the ends of bolts 74 and 75. These bolts are threaded into elongate plates 76 and 77, the shape of which can best be understood by reference to Figure 11. Elongate plates 76 and 77 are attached to the knife bar assembly 28 at their ends remote from the set screws 59 and 60 and their under sides are cut out to form hemicylindrical bearing surfaces 78 to coact with the stub shafts 57 and 58.

The table 30 is comprised not only of the side elements or sub-frames 65 and 69 but also includes a pair of cross frame elements 79 and 80, see Figure 1. The top surfaces of the sub-frames 65 and 69 are provided with hemicylindrical bearing surfaces, one of which is indicated at 81 in Figure 12.

It can now be seen that as the rock shaft 54 is oscillated by the operation of cam 51 the knife bar assembly 28 through the action of toggles 70 and 71 is rocked about the common axis of stub shafts 57 and 58. Referring again to Figure 1 it is now apparent that the clockwise movement of the knife bar assembly 28 is actually caused by the straightening of the toggle links brought about by the angular displacement of the elongated bases of the arms 63 and 67 and that the return or counterclockwise movement is gravity induced in response to the shortening of the effective length of the toggle links 70 and 71 caused by rocking of the shaft 54 in the other direction under the influence of weight 56.

The magnitude of the toggle action is controlled by the set screws 59 and 60, already described, and by stops 82 and 83. Upon reference to Figure 10 it will be observed that stops 82 and 83 are comprised respectively of threaded bolts 84 and 85 provided with heads 86 and 87 and nuts 88 and 89. Unlike the set screws 59 and 60 which bear against the upper surfaces of sub-frames 69 and 65 respectively, the bolts 84 and 85 pass freely through the tops of these sub-frames. Accordingly, the bolt heads 86 and 87 act as stops limiting the magnitude of the clockwise rocking movement of the knife bar assembly 28 as it is viewed in Figure 1. The ends of the bolts that comprise the stops 59 and 60, on the other hand, act against the top surfaces of sub-frames 69 and 65 respectively to limit the return or counterclockwise movement of the knife bar assembly 28 as it is viewed in Figure 1.

While the rocking action of the knife bar assembly is taking place the entire table 30 is being advanced by the periodic angular displacement of the screws 33 and 34. The table imparts its forward movement to the knife bar assembly 28 through the stub shafts 57 and 58 and the members 76 and 77 which are attached to the knife bar assembly 28 by bolts 90, see Figure 8.

The table 30, in its movement toward and away from the flitch, slides along tracks constituting the upper surface of stationary channel members 91 and 92, see Figure 10. The channel members 91 and 92 constitute the side elements of a rectangular sub-structure constituting the main support for the entire machine. Three cross frames 93, 94 and 95, see Figures 1 and 5, complete this sub-structure.

It will now be understood that as the flitch is reciprocated the knife 29, on each downward stroke of the flitch, cuts a slice. This slice is guided by ridges 96 on a brass plate 96a, constituting a part of the knife bar assembly 28, to a conveyor comprised of a plurality of belts 97. To support the belts a plurality of pulleys 98 are fixed in spaced relation on a shaft 99 and that shaft is driven through a pulley 100 connected by a dual V-belt 101 to a pulley 102 of a speed reduction gear train 103. The gear train 103 is provided with a power supply pulley 104 connected by a dual V-belt 105 to the driving sheave 106 of an electric motor 107, see now Figure 4.

The shaft 99 is supported in bearings 108 that are mounted on a bearing frame 109 that is connected by braces 110 and 111 to the table 30.

Each of the belts 97 is also supported by a pair of pulleys 112 and 113. The upper pulley 112 of each of these pairs is mounted in fixed position on a shaft 114 and each shaft 114 has pivotally mounted thereon a plurality of straps 115. Each of the straps 115 supports one of the pulleys 113.

It can now be seen that pulleys 113, being mounted on straps which are pivotally hung from the shaft 114, are movable toward and away from the pulleys 98 whereby the effective area encompassed by the belts 97 in passing around the pulleys 98, 112 and 113 can be varied. It can also be seen that, since the brackets 110 and 111 are attached to the table 30 while the shaft 114 is mounted in the knife bar assembly 28, there will be relative movement between pulleys 112 and 98 arising from the rocking action of the knife bar assembly about stub shafts 57 and 58.

This rocking action has heretofore prevented the use of conveyor belts to remove the slice from the immediate vicinity of the knife and has considerably hampered the operators in the extraction of the work output of the machine. Now, however, as a result of an important part of the present invention it has been made possible to employ conveyor belts such as are shown in the drawings at 97. This advantage is achieved through the use of dual pulleys 112 and 113, the one being fixed relative to the knife bar assembly and the other being movable with respect to that assembly albeit supported therefrom by straps 115.

To maintain the belts 97 tight despite the rocking action of the knife bar assembly each strap 115 has attached thereto near the midpoint thereof a hollow tube 116, see Figure 9, in which there is received the shank of a rod 117 that is anchored to the knife bar assembly at 118. A nut 119 is threaded onto the rod 117 and, between this nut and a free washer 120, there is interposed a compressed coil spring 121. The thrust of the spring 121 is such as to bias the respective strap in a counterclockwise direction about its pivot at 114 as viewed in Figure 8.

As a result of the foregoing the lower pulley 113 is always spring urged to define with the pulleys 98 and 112 a maximum area for the belt to encompass. Accordingly the belts are kept tight at all times despite the rocking action of the knife bar assembly which is continually changing the space between the pulleys 98 and the pulleys 112. Furthermore, because one assembly of the type shown in Figure 9 is associated with each strap 115, the belts 97 are individually tensioned so that compensation is afforded for differences in stretch characteristics as between individual belts and even minor differences in initial length are fully compensated.

Above the knife bar assembly 28 is located the pressure bar assembly 122 which comprises a pressure bar 123 and a pressure cap 124. The pressure bar cap 124 is of very rugged and heavy construction and is of increased size at the center in order to resist the severe strain to which it is subjected as a result of the heat of the veneer cutting operation. The cap 124 is held in place by two large stud bolts 125 and 126 at its opposite ends which pass through blocks 127 and 128 that are integral with the cap 124. The stud bolts also pass through integral projections 129 and 130 of the knife bar assembly 28 and it is by this arrangement that the cap assembly 124 is held from the knife bar assembly for movement therewith. Two bolts 131 at opposite sides of the machine serve to adjust the blocks 127 and 128 vertically and four bolts 132 threaded into the blocks 127 and 128 but bearing on the upper surface of the knife bar assembly serve to distribute the load of the adjustment.

The pressure cap 124 is provided at its upper margin with a channel element 133 which is bolted at its opposite ends to the pressure cap 124 and is provided at the center with an adjusting bolt 134 by which the entire pressure cap can be stressed as necessary to compensate for heat distortion.

At the rear margins the pressure cap is also provided with a stressing device, this time in the form of a pair of straps 135 connected by bolts to the opposite ends of the cap 124 and centrally connected together at 136 to receive a stressing bolt 137 similar in structure and function to the bolt 134 acting on the upper skirt of the cap 124. The cap 124 is also provided with reinforcing webs at 138.

It can now be seen that elaborate and complete adjustment of the pressure bar cap is possible whereby the pressure bar 123 may be rigidly maintained in any precise position of adjustment throughout a cutting operation and despite the heat generated thereby.

Having now described the basic structure of the machine so that a general understanding of its operation can be had, reference will now be made to details of construction and to the controls which constitute an important part of this invention and which render the machine safe and easy to use as well as productive of a very high quality finished veneer.

Figure 3:
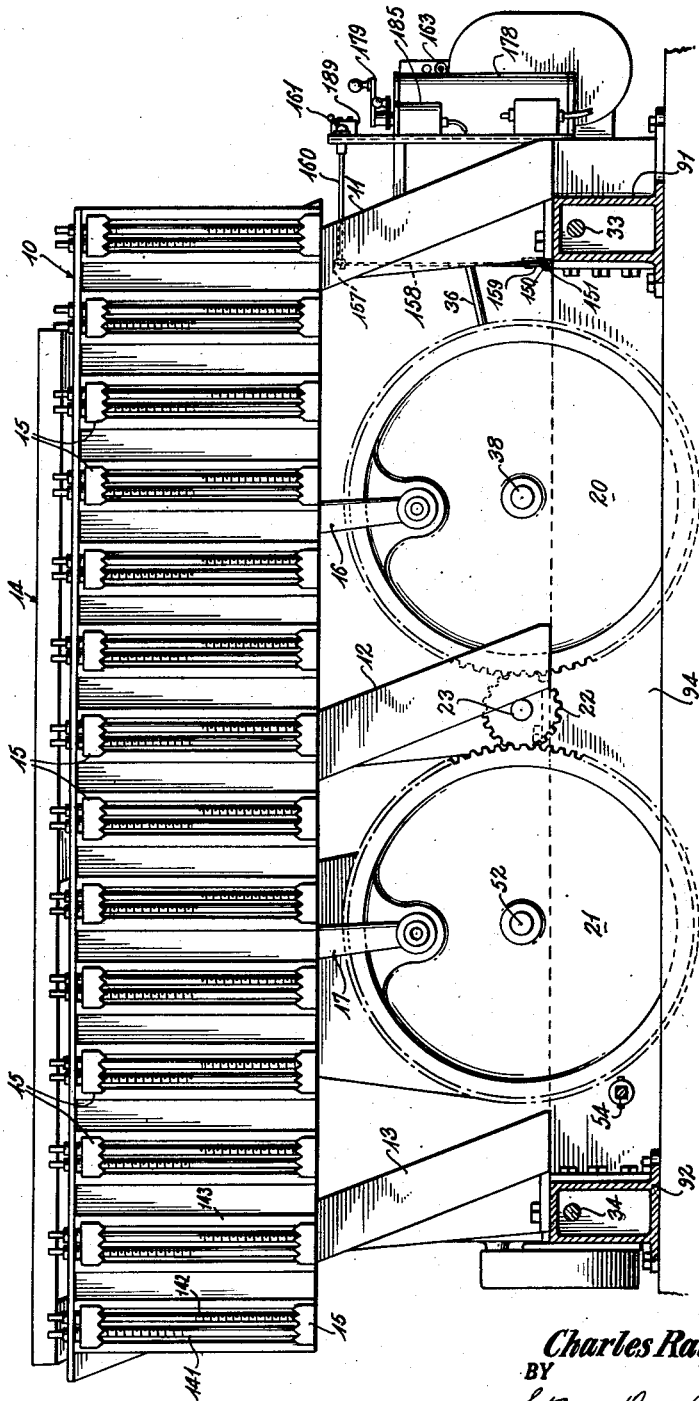
Figure 3 is a view in elevation looking into the front or flitch holding portion of the flitch table of the machine of Figure 1.
Figure 4:
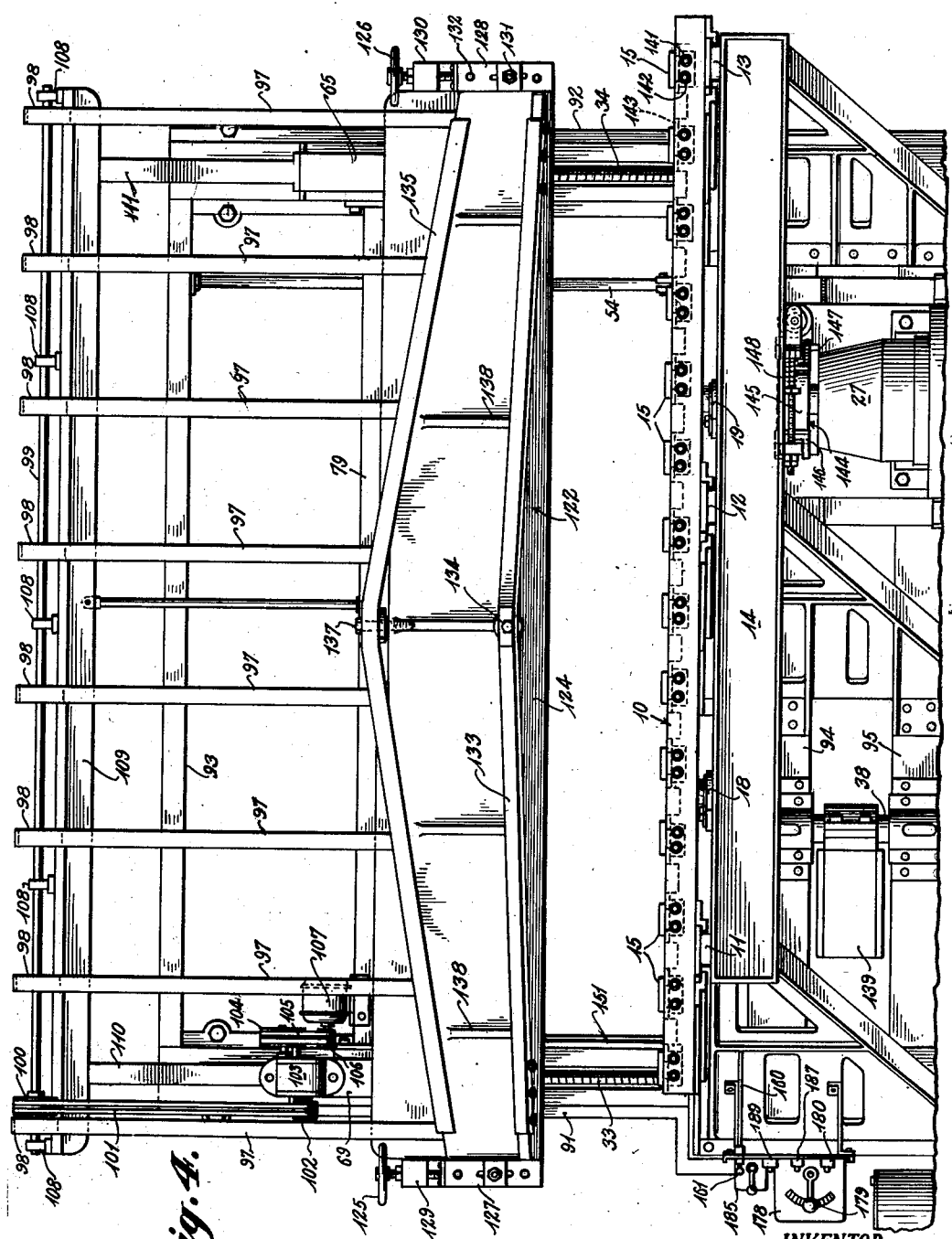
Figure 4 is a top plan view of the machine, a portion of the operating mechanism being deleted in the interest of convenience of illustration.

The machine is capable of handling very large and heavy flitches and the entire flitch table 10 is very heavy. Accordingly, to insure smooth operation, large and heavy counterweights 139 and 140 are provided on shafts 38 and 52 respectively. These counterweights naturally impart considerable inertia to the machine and with the inclined guide rails 11, 12 and 13 a smooth draw cut is effected. The dogs 15 which hold the flitch are arranged in pairs at the top and bottom respectively of a pair of shafts 141 and 142 that are oppositely threaded. The lower dogs of Figure 3 are raised by turning the respective shaft 141 in one direction while the upper dogs are lowered by turning the respective shaft 142 in the same direction. This greatly contributes to the ease with which the flitch is attached to the table by permitting the use of a pneumatic wrench during flitch changes. The dogs 15 ride in steel guide strips 143.

While the inertia of the flitch table is generally desirable it is a feature of the present invention to provide means for stopping the table instantly should a condition be encountered requiring such action. To this end the main motor 27 is provided with an electromagnetic brake 144. As can be seen upon reference to Figures 2 and 4 this brake acts on a drum 145 fixed to the shaft of the main motor 27 and comprises shoes 146 and 147 which are expanded by a spring 148. A solenoid 149, when energized, operates the shoes through links to set the brake. Due to the use of the multiple V-belts 25 the braking action applied to the motor shaft is transmitted to the flitch table without appreciable slippage and yet without causing damaging shock to the gears 20, 21 and 22.

Another safety feature of the present invention involves the automatic stopping of the knife table feeding mechanism when the knife has moved toward the flitch for a predetermined distance. This apparatus can best be understood by reference to Figures 17, 18 and 19 wherein there is shown a rod 150 which extends along the bed frame 91 in a mounting tube 151. The rod 150 lies in the path of a bolt 152 which is threaded into a bracket 153 mounted on the rear of a knife table sub-frame 69. By adjusting the magnitude of the extension of the bolt 152 to the left of the bracket 153 as viewed in Figure 17, it is possible to predetermine a position of the knife relative to the flitch at which the bolt 152 will engage and displace rod 150. Accordingly, when a desired number of slices have been cut from the flitch it is possible to stop the forward feed of the knife by an instrumentality under the control of the rod 150. This instrumentality is a solenoid 154, see Figure 16, which retracts the pawl 35 from the teeth of the ratchet wheel 39 so that the ratchet wheel is no longer driven by the pawl and hence no longer drives the threaded rods 33 and 34. The solenoid 154 is connected to a switch 155 which in turn is mechanically actuated by a link 156 connected to the end of the rod 150 when rod 150 is displaced to the left of Figure 17 under the influence of bolt 152.

A manual method for retracting the pawl is afforded by link 157, rod 158 and bell crank 159. Thus, an operator, by turning the shaft 160, on which the link 157 is fixed, can cause displacement of the rod 150 to the left and bring about retraction of the pawl 35 regardless of the position of the bolt 152.

The manner in which the lower arm of bell crank 159 is attached to rod 150 can best be understood by reference to Figures 18 and 19. It can be seen that a slot is cut in the rod 150 and that the arm of the bell crank is passed into this slot without a fastening of any sort. The shaft 160 passes to the left side of the machine and terminates in an operating crank 161.

The details of the ratchet and pawl 39—35 can be seen in Figures 13 and 16. The pawl 35 is pivotally attached by a bolt 162 to a bifurcated frame 163 which is freely pivotally mounted on an axle 164 to which the ratchet wheel 39 is keyed.

The frame 163 is connected by a bolt 165 to a pitman 36 which connects the frame to the crank 37. The crank 37 comprises a housing 166 attached and keyed to shaft 38. The housing 166 is provided with a bushing 167 which receives an unthreaded end of a bolt 168. The bolt 168 carries thereover a threaded sleeve 169 and this sleeve is provided with an integral pin 170 having a bearing sleeve 171 thereover for receiving therearound the end of the pitman 36. In the position shown in Figure 13 it is apparent that the pin 170 and shaft 38 are on a common axis so that no movement of the pitman 36 will occur when shaft 38 turns. If, however, screw 168 is turned through a keyed collar 172 it is possible to displace sleeve 169 axially of the housing 166 to create a crank arm between the axes of shaft 38 and pin 170. The magnitude of the length of the adjustable crank arm can be read on a calibrated scale 173 carried by the housing 166 and a pointer 174 carried by the sleeve 169. Thus the rate of feed of the knife to the flitch and hence the thickness of the cut is accurately controllable and the scale 173 may be calibrated in terms of thickness, for example in one-hundredths of an inch as indicated in Figure 14. Nut 175 is a lock nut for the screw 168 and nut 176 and washer 177 are retainers for the pitman 36.

Figure 20:
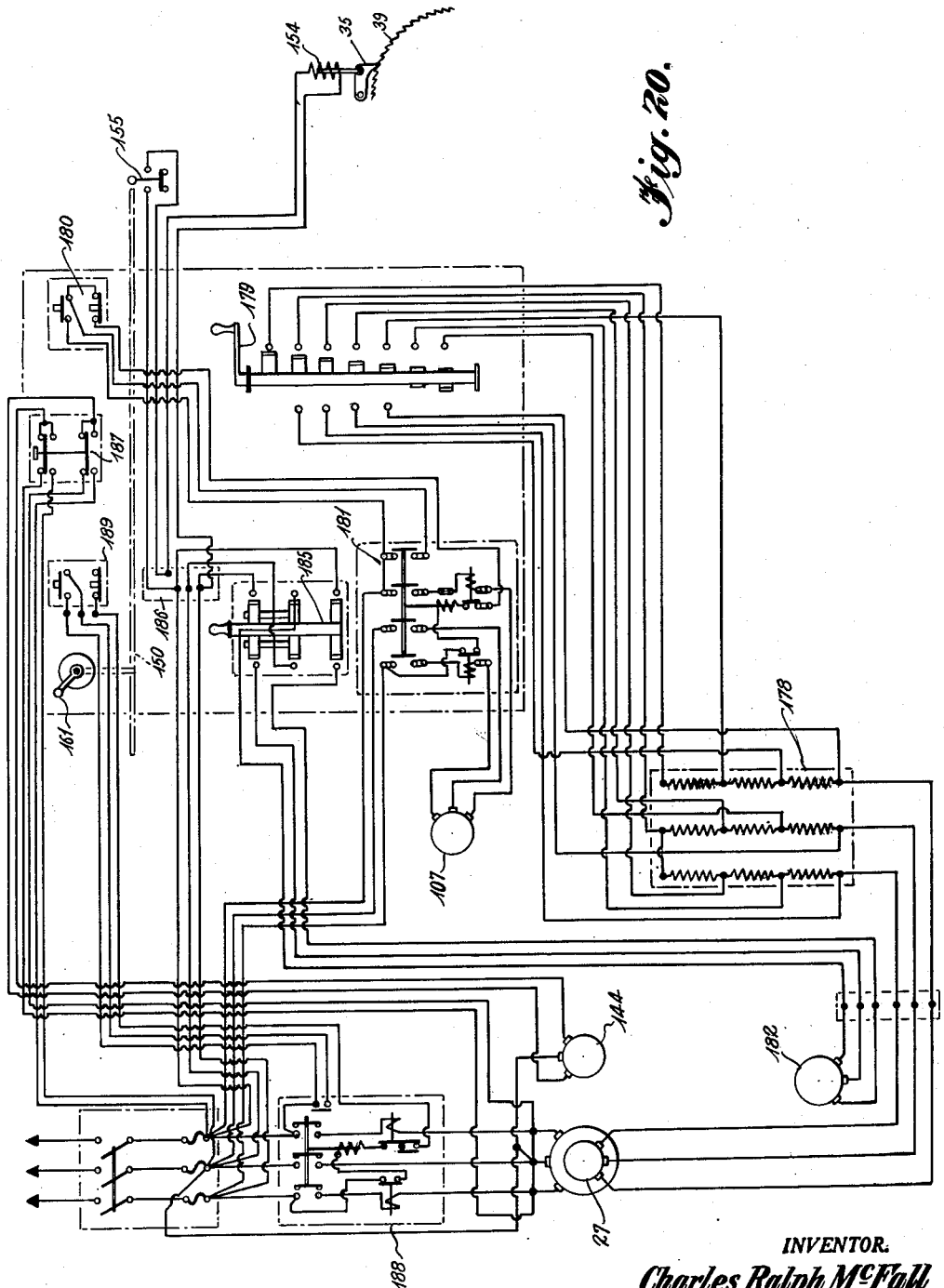
Figure 20 is a circuit diagram illustrating the interrelation of the various power sources and controls with which the machine is equipped.

Upon reference to Figures 1 and 20 it will be noted that the speed of motor 27 is controlled by an adjustable series resistor 178 provided with a control handle 179. This speed variation of course controls the rate at which slices are cut. The crank 37, on the other hand, controls the thickness of the slices. Regardless of these adjustments, however, the removal of the slices goes on at an unvarying rate predetermined by the speed of motor 107 and correlated with the manual operations required incident to removal of the cut slices from the belts 97. Accordingly, the motor 107, see Figure 20, is under the control of a push button switch 180 controlling a main switch 181 whereby the motor 107 is rendered entirely independent of the main motor 27.

Figure 2:
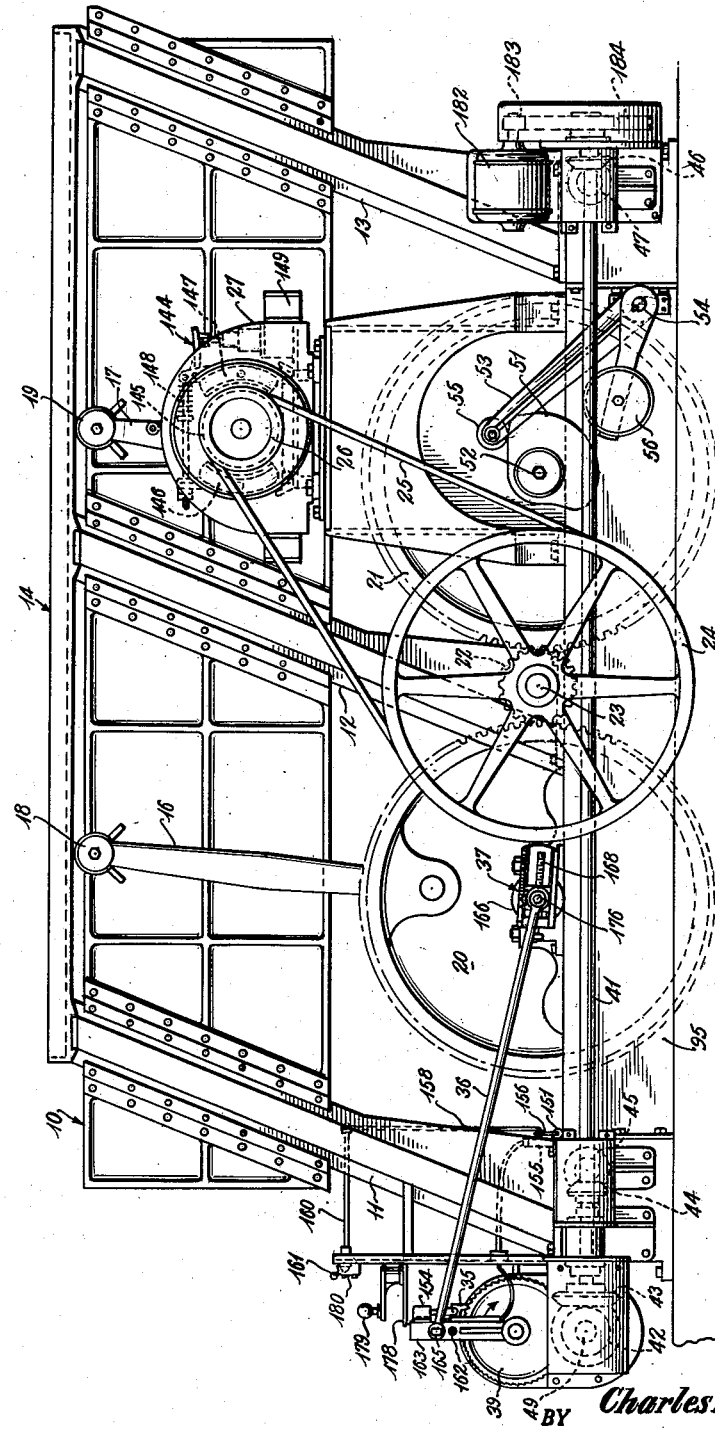
Figure 2 is an end view showing, in elevation, the drive for the flitch table and a portion of the mechanism for advancing the knife toward the flitch.

Another motor not heretofore described is provided for the purpose of backing off the table 30 in preparation for the installation of a new flitch and for quickly running the table 30 toward the flitch before starting the cutting operation. This motor which is clearly seen in Figure 2 is represented by reference numeral 182. Its rotor shaft is provided with a gear 183 which meshes with a gear 184 on the end of shaft 50.

The motor 182, being connected by gearing to the shaft 50, which is normally driven by the ratchet and pawl assembly 35—39, is provided with a control of such a nature that the solenoid 154 has to be energized to retract the pawl 35 from operating position before the motor 182 can be energized. This arrangement is best shown in Figure 20 where it is seen that a forward-off-reverse type of switch 185 is connected to the motor 182 through the junction box 186, this switch being interlocked with the solenoid 154 so that when the motor 182 is energized in either direction the solenoid 154 is also energized to retract the pawl 35 from its driving position. Also through the junction box 186 the switch 155 is connected to the solenoid 154.

A switch 187 designates the controlling instrumentality for the magnetic brake 144. It will be noted that the switch 187 is interlocked with another magnetic controller switch 188 in such a way that energization of the brake motor 144 by operation of switch 187 automatically causes switch 188 to cut off the current to main motor 27. Normally main motor 27 is controlled by a push button stop-start switch 189. In physical arrangement switches 189, 187 and 188 are side by side on the control panel at one side of the machine, see Figure 1. This arrangement contributes in no small extent to the safety and ease of operation of the machine since a right-handed operator can watch the flitch and at all times keep his hand on or near the basic controls of the machine.

The heretofore undescribed part of the wiring in Figure 20 is generally conventional for motors of the type employed. Numeral 190 designates, of course, the master switch for the whole system.

While, as shown in Figure 20, the rod 150 acts only with the solenoid 154 it is apparent that by a minor change in wiring it could be made to apply also to the run up motor 182 should that be desirable in any given instance.

The entire operation of the machine will now be apparent and to complete an understanding of this invention it is only necessary to describe the sequence of events through an entire cutting cycle.

A properly soaked and wet flitch is placed on the flitch table and is fastened in position by adjustment of the dogs 15. While this is done the table 30 will be retracted to the left of Figure 1. When the flitch is in place motor 182 is shut off by operation of switch 185 and button 189 is pushed to start the conveyor. Button 189 is also pushed to start the main motor and to cause the stepwise advancement of the table 30 and knife blade assembly 28 toward the flitch. The cut to be taken is, of course, already predetermined by adjustment of the crank 37. Normal cutting of slices then continues until the rod 150 actuates switch 155 to disengage pawl 35 and stop the advance of the knife.

Figure 7:
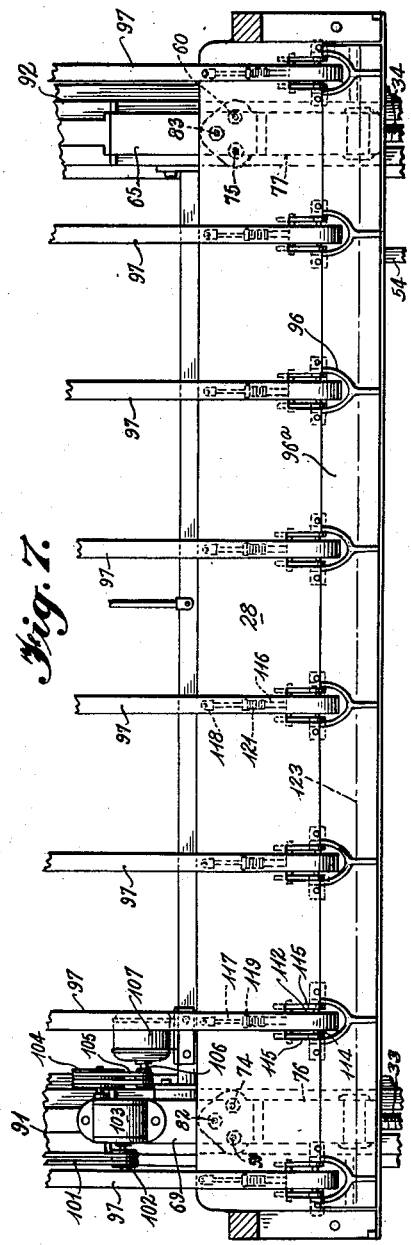
Figure 7 is a view in horizontal section taken on the line 7—7 of Figure 6.

The wet slices as cut are passed in wiping relation over the ridges 96 of the brass plate 96a, see Figure 7, onto belts 97. Excess moisture is kept off the belts 97 due to the arrangement of the ridges in protective relationship on either side of the slots in the brass plate through which the pulleys 112 project. This prevents staining of the slices in the course of their contact with the belts 97. An operator receives the slices at the left end of the conveyor as viewed in Figure 1 and stacks them in the usual manner. After the flitch has become exhausted the table 30 and the parts carried thereby are retracted by operation of the motor 182 in a direction opposite to the run up direction. The brake motor 144 is then energized by operation of switch 187 to stop the flitch table to permit replenishment of the flitch.

In the event of an emergency, such as encountering a blade damaging obstruction in the flitch, the brake is, of course, operated immediately.

While this invention has been described with reference to but a single embodiment thereof, it is to be understood that changes in the details of construction and in the mode of operation will occur to those skilled in the art and such changes are contemplated as a part of this invention as it is defined in the appended claims.

What is claimed is:

1. A veneer slicing machine comprising means to reciprocate a flitch in a fixed path, a knife assembly, a knife table, means connecting said knife assembly to said table for limited rocking movement, means to advance said table toward said flitch path, a plurality of belts constituting a conveyor for receiving the slices cut from the flitch, each of said belts including a supporting pulley supported from said knife assembly and a supporting pulley supported from said knife table, and resilient means associated with each belt for maintaining it tight.

2. A veneer slicing machine comprising means to reciprocate a flitch in a fixed path, a knife assembly, a knife table, means connecting said assembly to said table for limited rocking movement, means to advance said table toward said flitch path and a belt conveyor for receiving the slices cut from the flitch, said conveyor belt including a pulley in fixed relation to said table, a pulley in fixed relation to said knife assembly and a pulley mounted for bodily pivotal movement from said table, and means resiliently biasing said last-named pulley away from the other two whereby to maintain the belt tight despite the rocking action of the knife assembly.

3. A veneer slicing machine comprising means to reciprocate a flitch in a fixed path, a knife assembly, a knife table, means connecting said knife assembly to said table for limited rocking movement, means to advance said table toward said flitch path, a plurality of flat belts arranged in parallel relationship for their respective upper courses to receive and convey the slices cut from the flitch, each conveyor belt including a pulley in fixed relation to said table, a pulley in fixed relation to said knife assembly, and a pulley mounted for bodily pivotal movement from one of the other pulleys, and resilient means biasing said last-named pulley away from the other two and toward the lower course of the belt in order to maintain the belt tight despite the rocking action of the knife assembly.

4. A veneer slicer comprising a flitch table mounted for reciprocation, a knife assembly mounted for movement to and from cutting relation to a flitch mounted on said table, a motor, means connecting said motor in driving relation to said flitch table, said connecting means including a rotating shaft, a crank, mounted on said rotating shaft, a screw for adjusting the length of the crank arm, a link connected to said crank, a pawl connected to said link, a ratchet wheel driven from said pawl, means connected to the ratchet wheel for moving said knife assembly toward said flitch table, a solenoid for retracting said pawl, a switch for energizing said solenoid, means carried by said knife assembly for actuating said switch upon the attainment of a predetermined position of said knife assembly relative to said flitch table whereby when the flitch has become depleted the advance of the knife assembly is automatically stopped.

5. A veneer slicer comprising a flitch table mounted for reciprocation, a knife assembly mounted for movement to and from cutting relation to a flitch mounted on said table, a main motor, means connecting said main motor in driving relation to said flitch table, said connecting means including a rotating shaft, an adjustable crank mounted on said rotating shaft, a pawl driven from said crank, a ratchet wheel driven from said pawl, means connected to the ratchet wheel for moving said knife assembly toward said flitch table, a solenoid for retracting said pawl, a switch for energizing said solenoid, a reversible motor geared to the means that is connected to said ratchet wheel, and a second switch for simultaneously operating said reversible motor and energizing said solenoid whereby the knife assembly may be quickly adjusted relative to the flitch table by energizing said solenoid and said second motor while permitting said main motor to continue in operation.

6. A veneer slicer comprising a flitch table mounted for reciprocating movement in a fixed path, a main motor, means connecting said motor in driving relation to said table, a knife assembly for cutting slices from a flitch mounted on said table, a knife table, means driven from said connecting means for periodically advancing said assembly toward said table in timed relation to the reciprocation of the flitch, means for adjusting said advancing means to control the thickness of the slice, means for controlling the speed of said motor to control the rate at which the slices are cut, a conveyor comprising a plurality of belts for receiving the slices cut from the flitch, each of said belts including a supporting pulley supported from said knife assembly and a supporting pulley supported from said knife table and resilient means associated with each belt for maintaining it tight, and a conveyor motor independent of said main motor for delivering the cut slices to an operator at a constant speed irrespective of the rate of cut or the thickness of cut of the slices.

7. A veneer slicer comprising a flitch table mounted for reciprocation in a fixed path, a knife assembly, a knife table, means connecting said knife assembly to said table for limited rocking movement, a motor, driving gears, pitmans connecting said table to said driving gears, shafts for said driving gears, counterweights on said shafts, a driving pinion for said gears, an electric brake acting on a rotor shaft of said motor and multiple V-belts connecting the rotor shaft of said motor to said pinion, a plurality of belts constituting a conveyor for receiving the slices cut from the flitch, each of said belts including a supporting pulley supported from said knife assembly and a supporting pulley supported from said knife table, and resilient means associated with each belt for maintaining it tight.

8. A veneer slicer comprising a flitch table mounted for reciprocating movement in a fixed path, a knife assembly mounted for movement into cutting relation with a flitch mounted on said table, a knife table, common means for reciprocating said flitch table and for moving said assembly, an electric brake for instantly stopping said common means, a plurality of belts constituting a conveyor mounted on said assembly for conveying the slices cut from a flitch, each of said belts including a supporting pulley supported from said knife assembly and a supporting pulley suported from said knife table and resilient means associated with each belt for maintaining it tight, and means independent of said common means for driving said conveyor whereby the conveyor may continue to operate despite the actuation of said electric brake to remove the already cut slices from the vicinity of the knife assembly.

References Cited in the file of this patent

UNITED STATES PATENTS

| Number | Name | Date |
|---|---|---|
| 172,428 | Haddock | Jan. 18, 1876 |
| 410,403 | Crane | Sept. 3, 1889 |
| 425,988 | Crane | Apr. 22, 1890 |
| 793,306 | Koss | June 27, 1905 |
| 858,568 | Brosius | July 2, 1907 |
| 1,132,464 | Elmore | Mar. 16, 1915 |
| 1,143,081 | Shellenberger | June 15, 1915 |
| 1,615,489 | Straub | Jan. 25, 1927 |
| 1,841,544 | Merritt | Jan. 19, 1932 |
| 2,147,531 | Heath | Feb. 14, 1939 |
| 2,303,213 | Koss | Nov. 24, 1942 |